US012637170B2

(12) United States Patent
Manewald

(10) Patent No.: US 12,637,170 B2
(45) Date of Patent: May 26, 2026

(54) DEVICE AND METHOD FOR CONTROLLING A MOTOR ASSISTANCE PROVIDED BY A MOTOR OF AN ELECTRIC BICYCLE

(71) Applicant: Robert Bosch GmbH, Stuttgart (DE)

(72) Inventor: Merlin Martin Manewald, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 212 days.

(21) Appl. No.: 18/543,434

(22) Filed: Dec. 18, 2023

(65) Prior Publication Data

US 2024/0217617 A1 Jul. 4, 2024

(30) Foreign Application Priority Data

Dec. 22, 2022 (DE) ..................... 10 2022 214 308.6

(51) Int. Cl.
*B62M 6/45* (2010.01)

(52) U.S. Cl.
CPC ..................................... *B62M 6/45* (2013.01)

(58) Field of Classification Search
CPC ......................................................... B62M 6/45
See application file for complete search history.

(56) References Cited

FOREIGN PATENT DOCUMENTS

| | | | | |
|---|---|---|---|---|
| DE | 20 2005 006 684 U1 | 9/2005 | | |
| DE | 10 2013 215 487 A1 | 2/2015 | | |
| DE | 10 2013 215 759 A1 | 2/2015 | | |
| DE | 10 2017 107 205 A1 | 10/2018 | | |
| DE | 10 2020 200 198 A1 | 8/2020 | | |
| DE | 10 2021 207 839 A1 | 1/2023 | | |
| DE | 10 2021 208 022 A1 | 1/2023 | | |
| EP | 3025898 A1 * | 6/2016 | .............. | B62M 6/55 |

* cited by examiner

*Primary Examiner* — Calvin Cheung

(74) *Attorney, Agent, or Firm* — Maginot, Moore & Beck LLP

(57) ABSTRACT

A method for controlling a motor assistance provided by a motor of an electric bicycle is disclosed. The method includes controlling a motor assistance by the motor based on a first control value when the bicycle is moved at a speed below a first limit speed, wherein the first control value is calculated by way of a first regulation algorithm. The method also includes controlling the motor assistance by the motor based on a second control value, after a transition phase has been completed, the second control value being calculated by way of a second regulation algorithm, the second regulation algorithm controlling the motor assistance in such a way that the speed of the bicycle assumes a downward regulation speed.

14 Claims, 3 Drawing Sheets

DEVICE AND METHOD FOR CONTROLLING A MOTOR ASSISTANCE PROVIDED BY A MOTOR OF AN ELECTRIC BICYCLE

This application claims priority under 35 U.S.C. § 119 to patent application no. DE 10 2022 214 308.6, filed on Dec. 22, 2022 in Germany, the disclosure of which is incorporated herein by reference in its entirety.

BACKGROUND

The present disclosure relates to a method for controlling motor assistance provided by a motor of an electric bicycle. The present disclosure also relates to an associated method.

With electric bicycles, a torque applied by a driver is usually multiplied by an assistance factor in order to determine the motor torque provided by the electric bicycle's motor. A driver's torque is therefore used to determine the motor assistance to be provided by the motor. However, as motor assistance may only be provided up to a certain level, the motor assistance is reduced or set by a downward regulation function at a downward regulation speed and a maximum permissible downward regulation speed above which the motor assistance must be set. These downward regulation speeds are typically selected based on legal requirements. In the following, maximum permissible downward regulation speed (v_max) refers to the maximum permissible speed up to which motor assistance may be provided (e.g., 27.5 km/h). Below this is the speed range with the downward regulation limit, where the downward regulation function ensures a comfortable ramp-down of the motor assistance for the driver (e.g., 24.5 km/h-27.5 km/h). The downward regulation speed (v_a) is within the downward regulation limit (e.g., 26 km/h) and represents the speed that is set during travel by the downward regulation function.

However, experience has shown that the average driver of an electric bicycle prefers to ride predominantly in the downward regulation range, if conditions permit. In Germany, for example, the law only permits motor assistance up to a maximum of 25 km/h+10%. Drivers usually only ride faster if they do not need motor assistance and also want the higher speed. The driver usually only drives slower if his own power plus the available motor power is not sufficient to reach the downward regulation speed, which is the case, for example, on a slope, or if this is desired by the driver, which may be the case in a bottleneck, for example.

The control of an electric bicycle is currently primarily based on calculating a resulting motor power or a resulting motor torque from the driver's power and/or the driver's torque. The motor is also downward regulated at the downward regulation speed, but so far it does not specifically take into account the fact that the driver usually wants to drive mainly at the downward regulation speed, the driver usually wants to drive as fast as possible and the driver wants to drive as relaxed as possible, i.e., with low power output. This means that the control methods known to date for motor assistance on electric bicycles are suboptimal in the range of the downward regulation speed or when approaching the downward regulation speed.

DE 10 2013 215 759 A1 discloses a cruise control system for a motorized bicycle. A desired speed can be preselected at an input arrangement.

DE 10 2017 107 205 A1 discloses a muscle-powered vehicle, such as an e-bike, with a distance-adaptive cruise control system for longitudinal guidance of the vehicle.

DE 20 2005 006 684 U1 describes a vehicle, such as an electric bicycle, that can be operated by a user and an auxiliary motor. The vehicle comprises a control device which influences the auxiliary motor in such a way that the auxiliary motor drives the vehicle from a standstill or from a relatively low speed up to a prescribed limit speed, even without propulsion by the user.

SUMMARY

The method according to the disclosure for controlling a motor assistance provided by a motor of an electric bicycle, comprising controlling a motor assistance by the motor based on a first control value when the bicycle is moved at a speed below a first limit speed, wherein the first control value is calculated by means of a first regulation algorithm, and controlling the motor assistance by the motor based on a second control value, after a transition phase has been completed, the second control value being calculated by means of a second regulation algorithm, the second regulation algorithm controlling the motor assistance in such a way that the speed of the bicycle assumes a downward regulation speed.

The device according to the disclosure for controlling a motor assistance provided by a motor of an electric bicycle is configured to control a motor assistance by the motor based on a first control value when the bicycle is moved at a speed below a first limit speed, wherein the first control value is calculated by means of a first regulation algorithm, and to control the motor assistance by the motor, after completion of a transition phase, on the basis of a second control value, the second control value being calculated by means of a second regulation algorithm, the regulation algorithm controlling the motor assistance in such a way that the speed of the bicycle assumes a downward regulation speed.

The downward regulation speed is preferably as close as possible to the maximum permissible downward regulation speed.

At least two regulation algorithms are therefore executed in order to generate control values for controlling the motor assistance. The algorithms are either executed continuously during operation of the bicycle or are executed at least when the resulting control values are required for controlling the motor assistance by the motor or for generating a transition control value.

The first regulation algorithm can be any regulation algorithm that is suitable for determining the motor assistance provided by the motor.

The second regulation algorithm is designed in such a way that the motor assistance is controlled by the second regulation algorithm in such a way that the speed of the bicycle assumes the downward regulation speed. If the driver drives close to the downward regulation speed, the motor assistance is regulated to the downward regulation speed. The downward regulation speed is therefore a target value of the second regulation algorithm. The downward regulation limit is the speed range around this target value that is necessary for comfortable regulation for the driver. The maximum permissible downward regulation speed must not be exceeded, as no motor assistance is permitted above this speed. This means that the motor assistance does not change in a given ratio to the driver's torque or power, but is set in such a way that the bicycle is moved at the downward regulation speed as far as possible. In particular, driver influences can be minimized in this way. This is particularly advantageous because a driver of the bicycle typically wants the bicycle to be moved at maximum speed, which is assisted by the motor, even at low driver's power. Optionally, the motor assistance is controlled by the motor based on the second control value only if the bicycle is moved at a speed below a third limit speed, the third limit speed being greater than the maximum permissible downward regulation speed or equal to the maximum permissible downward regulation speed. Thus, the motor assistance is advantageously not controlled based on the second control value and the second regulation algorithm if the power applied by the driver is sufficient to accelerate the bicycle beyond the maximum permissible downward regulation speed.

The control of the motor assistance by the motor based on the transition control value takes place in the transition phase to enable a smooth change between the first regulation algorithm and the second regulation algorithm. For example, a direct change from controlling the motor assistance based on the first control value to controlling the motor assistance by the second control value would lead to a possibly surprising acceleration of the bicycle to the downward regulation speed. This is avoided by the transition control value.

The transition control value is calculated based on the first control value and at the same time based on the second control value. It is particularly advantageous if a continuous transition is achieved between controlling the motor assistance based on the first control value and controlling the motor assistance based on the second control value. As the bicycle accelerates beyond the first limit speed, the second control value is increasingly weighted. This means that the second control value is increasingly used to control the motor assistance the closer the bicycle gets to the downward regulation speed or the downward regulation limit. For example, the second control value can be faded in in relation to the first control value over a period of time, such as three seconds. For example, the second control value can also be faded out in relation to the first control value over a period of time, such as one second, during braking. The duration of the fade-in and fade-out of the second control value can also depend on the approach to the downward regulation speed/limit. This means that the second control value can be weighted more quickly the closer the speed of the bicycle approaches the downward regulation speed/limit. The weighting of the second control value in relation to the first control value can be designed depending on the current speed.

The control of the motor assistance by the motor based on the transition control value and also based on the second control value can optionally be dependent on other parameters. For example, a driver's power or driver's torque can also be an additional parameter for deciding whether the motor assistance should be controlled by the motor based on the transition control value. For example, it can be advantageous if the motor assistance is not controlled based on the transition control value if the speed exceeds the maximum permissible downward regulation speed due to the bicycle rolling downwards.

If the bicycle is traveling in a speed band below or around the downward regulation speed, an alternative method of motor assistance should be used, which is given by the second regulation algorithm. Alternatively, the alternative method can only be used if the bicycle has already been riding continuously in the speed band for a defined period of time. Another condition for activation can be that the driver is pedaling at a minimum level, i.e., a cadence and/or torque and/or power of the driver is above a threshold value. As long as the driver is pedaling at the minimum level (cadence and/or torque and/or power above the threshold value), this is interpreted as a ride request with maximum assistance speed. One of the resulting advantages is that the driver can sail along in a very relaxed manner without a high level of personal effort. Typically, a minimum power of the driver can be 20 W, which is significantly lower than what a driver usually has to pedal in the downward regulation. If the driver falls below the minimum level, the alternative method is terminated. The same applies if the bicycle speed deviates from another speed band or if this band is met for a certain period of time.

In particular, there is a continuous transition between standard & alternative methods, i.e., between the pure use of the first regulation algorithm and the second regulation algorithm. For example, the second regulation algorithm is all the more effective the closer the driver gets to the downward regulation speed or the longer he has been approaching it. In particular, the duration of the fade-in and fade-out of the alternative method can also depend on the approach to the downward regulation speed/limit (e.g., the closer to the downward regulation speed, the faster the fade-in).

Preferred embodiments of the disclosure are set forth below.

Preferably, the motor assistance is further controlled by the motor based on a transition control value in the transition phase when the bicycle is moved at a speed above the first limit speed, wherein the transition control value is calculated based on the first control value and the second control value.

Preferably, the transition phase lasts for a predefined period of time or ends when the bicycle is moved at a speed above a second limit speed. The duration of the transition phase is therefore preferably time-dependent or speed-dependent.

Preferably, the motor assistance is controlled by the motor based on the second control value only when the bicycle is moved at a speed above the second limit speed over a predefined time interval, a cadence is above a predefined first threshold value, a driver's torque is above a predefined second threshold value, and/or a driver's power is above a predefined third threshold value. The cadence, driver's torque and driver's power is a value given by the driver's activity and is preferably recorded by a sensor system and compared with the respective threshold value. This means that the motor assistance is not necessarily controlled directly based on the second control value when the first limit speed is exceeded, as this is not necessarily always desired. Situations in which the onset of the transition phase is desired could be recognized by the aforementioned parameters, i.e., by means of a time interval, the driver's cadence, the driver's torque, i.e., the torque currently applied by the driver of the bicycle, or the driver's power. A combination of these parameters or monitoring of all these parameters is also advantageous. This results in intuitive motor control behavior that is perceived as pleasant by the driver.

Furthermore, the first control value is preferably a target value for a motor torque to be provided by the motor or a motor power to be provided by the motor. Further preferably, the second control value is a target value for a motor torque to be provided by the motor or a motor power to be provided by the motor. Further preferably, the transition control value is a target value for a motor torque to be provided by the motor or a motor power to be provided by the motor. The control values are thus selected in particular in such a way that they preferably have a direct influence on the torque provided by the motor or the motor power provided by the motor.

Preferably, the first regulation algorithm determines the first control value based on a detected driver's power and/or a detected driver's torque. The first regulation algorithm is therefore preferably a conventional regulation algorithm, wherein the first regulation algorithm is preferably selected in such a way that an assistance factor is applied to the detected driver's power and/or the detected driver's torque in order to calculate the desired motor torque, i.e., the motor torque to be provided, or the motor power to be provided.

Preferably, the second regulation algorithm terminates the control of the motor assistance in such a way that the speed of the bicycle assumes the downward regulation speed when a driver falls below a minimum level of cadence, driver's torque and/or driver's power. The second regulation algorithm typically provides the motor assistance independently of the current cadence, the current bicycle torque and the current bicycle power. This means that the bicycle would not slow down if the driver pedaled more slowly or if the driver had less power. In order to allow the vehicle to slow down even without using the brake, it is advantageous to check the above values with regard to a minimum value. For example, if the driver stops pedaling, this typically indicates that the ride should be slowed down. This provides a convenient way to stop controlling the motor assistance based on the second control value and the second regulation algorithm.

It is also advantageous if the second regulation algorithm is used to control the motor assistance in such a way that the speed of the bicycle assumes the downward regulation speed, regardless of the driver's torque or power. However, this only applies in particular to values of driver's torque or driver's power that exceed the minimum level. According to the second regulation algorithm, the motor torque to be provided or the motor power to be provided is preferably not calculated based on the assistance factor.

The transition control value is preferably determined in such a way that the motor assistance has a continuous course when there is a change between controlling the motor assistance based on the first control value and controlling the motor assistance based on the second control value. The transition control value is preferably selected in such a way that it results in motor assistance that leads to acceleration of the bicycle. This acceleration is preferably dependent on the second control value. This creates a particularly smooth transition to the control of the motor assistance by the second regulation algorithm.

It is also advantageous if the transition control value is calculated using the following formula:

$$M_3 = M_1 + f * (M_2 - M_1)$$

wherein M1 represents the first control value, M2 represents the second control value, M3 represents the transition control value, and f is a parameter that increases or decreases from 0 to 1 as a function of speed or time with the transition phase. Thus, the transition control value is either applied for a predefined time if the transition between the first control value and the second control value is selected to be time-dependent, or the transition control value is speed-dependent if the control of the motor assistance is regulated independently of time and is controlled in response to the current speed. The parameter f can either be selected as speed-dependent, in which case it is determined based on a measured speed, for example, or it can be selected as time-dependent, in which case it is determined based on a running timer. The parameter f increases from the value 0, which is present at the first limit speed, and rises to the value 1, which is present at the end of the transition phase. The given formula makes it possible to fade in the second control value. This applies to accelerating the bicycle. At the same time, the first control value can be faded out. This applies to slowing down the speed of the bicycle.

Alternatively, it is advantageous if the transition control value corresponds to the larger control value of the second control value and the first control value weighted with the parameter f, wherein f is a parameter that increases or decreases from 0 to 1 as a function of speed or time during the transition phase.

This means that the first control value is replaced, for example, when the second control value increases if the first control value is equal to the second control value. This can also create a continuous transition between the first control value and the second control value.

It is also advantageous if the first regulation algorithm performs a less strong low-pass filtering of an input value of the regulation algorithm that is influenced by the user than is the case with the second regulation algorithm. In this application, the control method remains basically the same, but one or more parameters (in this case the filter constant(s)) are dependent on the first or second regulation algorithm. This means that the first regulation algorithm is more reactive, i.e., responds more quickly to the driver's actions. Thus, the second regulation algorithm creates a regulation algorithm that responds comparatively slowly to the user's action, creating a continuous riding experience as the bicycle is moved around the downward regulation speed. The advantageous aim of the second regulation algorithm can be to achieve a more comfortable driving experience for the driver, as the motor assistance is more evenly provided by the slower driver's torque filter and the driver does not usually expect a high level of reactivity from the motor assistance in the downward regulation limit.

The device according to the disclosure is suitable for carrying out the method according to the disclosure.

BRIEF DESCRIPTION OF THE DRAWINGS

Exemplary embodiments of the disclosure are described in detail in the following with reference to the accompanying drawing. The drawings include.

DETAILED DESCRIPTION

Figure 1:
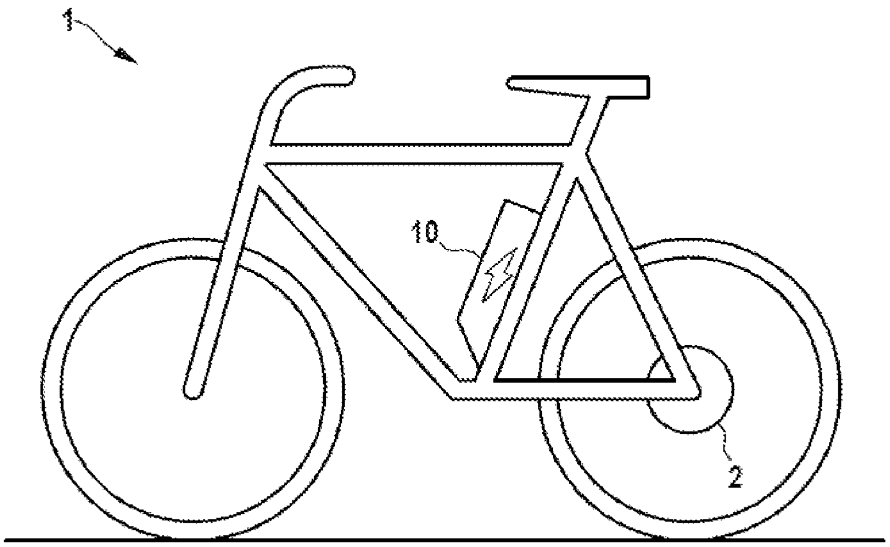
FIG. 1 a schematic illustration of a bicycle with a device according to the disclosure, FIG. 2 a flow chart of a method according to the disclosure, FIG. 3 an illustration of a transition between the first regulation algorithm and the second regulation algorithm, FIG. 4 an exemplary representation of an advantageous first and second regulation algorithm according to one embodiment of the disclosure, and FIG. 5 a schematic representation of an advantageous first and second regulation algorithm according to one embodiment of the disclosure.

FIG. 1 shows a schematic representation of an electric bicycle 1 on which a device 10 according to the disclosure is arranged for controlling a motor assistance provided by a motor 2 of the electric bicycle 1. A method 100 according to the disclosure is executed by the device 10 according to the disclosure. For this purpose, the device 10 preferably comprises an electronic computing unit which has software by means of which the method 100 is executed.

Figure 2:
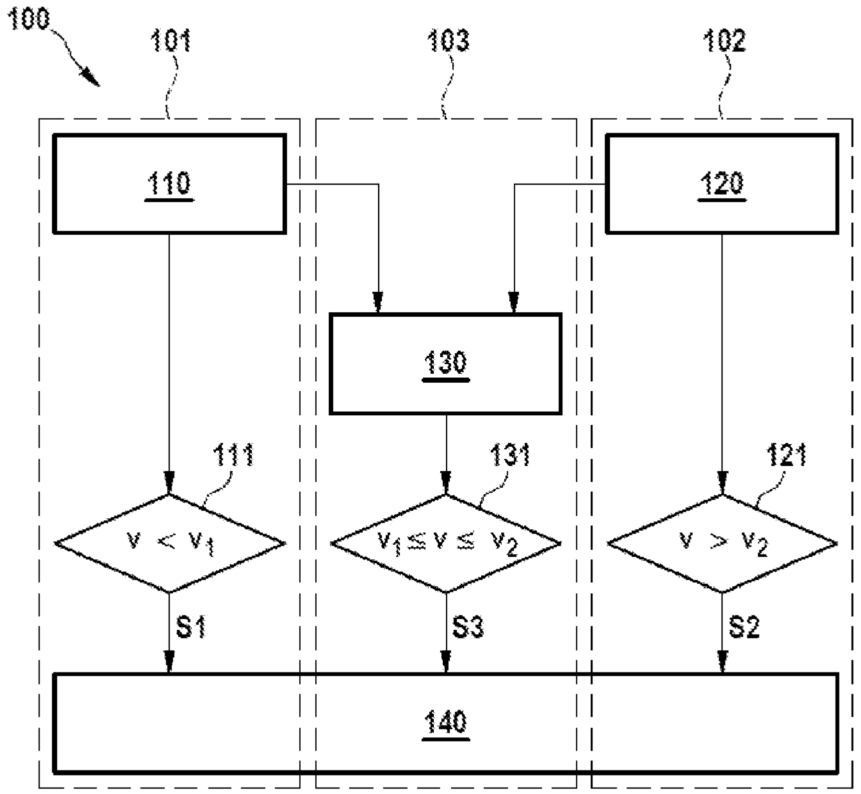

FIG. 2 shows an exemplary flow chart of the method 100. The method 100 controls the motor assistance provided by the motor 2 depending on the speed of the bicycle 1. Either a first control value S1, a second control value S2 or a transition control value S3 is used. Either the motor assistance is controlled 101 by the motor 2 based on the first control value S1, the motor assistance is controlled 102 by the motor 2 based on the second control value S2 or the motor assistance is controlled 103 by the motor 2 based on the transition control value S3. The provision of the control values S1 to S3 is shown in parallel in FIG. 2. Optionally, the first control value S1, the second control value S2 and the transition control value S3 are calculated at each point in time. Depending on a respective decision criterion 111, 121, 131, the first control value S1, the second control value S2 or the transition control value S3 is set in an application step 140 for controlling the motor 2. If the first decision criterion 111 is fulfilled, the first control value S1 is used to control the motor 2. If the second decision criterion 121 is fulfilled, the second control value S2 is used to control the motor 2. If the third decision criterion 131 is fulfilled, the transition control value S3 is used to control the motor 2. It is not absolutely necessary for all control values S1 to S3 to be calculated at all times. For example, the second control value S2 does not need to be calculated if the motor assistance is controlled solely on the basis of the first control value S1.

The control values S1 to S3 are target values for a motor torque to be provided by the motor 2 or a motor power to be provided by the motor 2. For example, in the application step 140, a currently available motor power or a currently available motor torque is determined and the motor assistance is either increased or decreased so that the motor torque provided by the motor 2 or the motor power provided by the motor 2 assumes the target value.

The first control value S1 is calculated using a first regulation algorithm 101. The first decision criterion 111 is used to check whether the electric bicycle 1 is moved at a speed v which is less than a first limit speed $v_1$. If this is the case, the first control value S1 for controlling 101 the motor assistance by the motor 2 is provided in the application step 140. The first regulation algorithm 101 determines the first control value S1 based on a detected driver's power or a detected driver's torque. For example, the recorded driver's power or torque is multiplied by an assistance factor in order to calculate the motor torque or power to be provided. The assistance factor can be speed-dependent. The first control value S1 is generated and provided with the motor torque or motor power to be provided.

The second control value S2 is calculated using a second regulation algorithm 120. The second decision criterion 121 is used to check whether the electric bicycle 1 is moved at a speed v that is greater than a second limit speed $v_2$. If this is the case, the second control value S2 for controlling 101 the motor assistance by the motor 2 is provided in the application step 140. The second regulation algorithm 120 controls the motor assistance by means of the second control value S2 in such a way that the speed v of the bicycle 1 assumes the downward regulation speed $v_{max}$. This means that the motor assistance is set by the second regulation algorithm 120 so that the bicycle 1 moves at the downward regulation speed $v_{max}$. This is initially independent of the existing driver's torque or the existing driver's power. In particular, the assistance factor is not used in the second regulation algorithm 120. The second regulation algorithm enables so-called sailing or gliding when riding the electric bicycle 1. This means that comparatively little energy has to be applied by a driver in order to move constantly at the downward regulation speed $v_{max}$.

A transition between the control 101 of the motor assistance by the motor 2 based on the first control value S1 and the control 102 of the motor assistance by the motor 2 based on the second control value S2 takes place in a transition phase. In the transition phase, the motor 2 controls 103 the motor assistance based on the transition control value S3. The transition control value is calculated in a calculation step 130 based on the first control value S1 and the second control value S2.

The transition control value S3 can be calculated in different ways in the calculation step 130. Preferably, the transition control value S3 is selected in such a way that it corresponds to the larger control value of the first control value S1 and the second control value S2. In this case, the third control value S3 is calculated as follows in calculation step 130:

$$M_3 = \max(M_2, f^*M_1)$$

Parameter $M_1$ represents the first control value S1, parameter $M_2$ the second control value S2, parameter $M_3$ the transition control value S3 and parameter f is a parameter that increases from 0 to 1 or decreases from 1 to 0 as a function of speed or time during the transition phase. The parameter f increases during a transition to control by means of the second control value S2 and the parameter f decreases during a transition to control by means of the first control value S1.

Alternatively, the transition control value S3 can be calculated using the following formula:

$$M_3 = M_1 + f * (M_2 - M_1)$$

Parameter M1 represents the first control value S1, parameter M2 the second control value S2, parameter M3 the transition control value S3 and parameter F is a parameter that increases from 0 to 1 or decreases from 1 to 0 as a function of speed or time during the transition phase. The parameter f increases during a transition to control by means of the second control value S2 and the parameter f decreases during a transition to control by means of the first control value S1.

The parameter f in the two examples described above increases or decreases continuously. Whether the parameter f increases or decreases depends on whether there is a transition from the first regulation algorithm 110 to the second regulation algorithm 120 or vice versa. The parameter F preferably increases when the change from the first regulation algorithm in the 10 to the second regulation algorithm 120 takes place.

In any case, it is advantageous if the transition control value S3 is determined in such a way that the motor assistance has a continuous course. In particular, the course of the applied control value is also continuous, meaning that a continuous control value is applied for controlling the assistance by the motor, which is made up of the first, second and transition control values S1, S2, S3.

In the example shown in FIG. 2, the transition phase begins when the first limit speed Vi is exceeded and ends when a second limit speed $v_2$ is exceeded. Alternatively, however, the transition phase can also be designed so that it extends over a predefined period of time, for example over 3 seconds during a transition from the control of the motor assistance based on the first control value S1 to the control of the motor assistance based on the second control value S2, or for example over one second during a reverse transition, i.e., during a transition from the control of the motor assistance based on the second control value S2 to the control of the motor assistance based on the first control value S1.

An exemplary value for the downward regulation speed $v_{max}$ is 25 km/h. An exemplary value for the first limit speed $v_1$ is 80%*$v_{max}$. An exemplary value for the second limit speed $v_2$ is 90%*$v_{max}$.

If the driver accelerates the bicycle 1 so that the current speed v is greater than or equal to the first limit speed $v_1$, the motor assistance is controlled by the motor 2 in the transition phase based on the transition control value S3. This is done with the intention of creating a transition to the control 102 of the motor assistance by the motor 2 based on the second control value S2.

Once the transition phase has expired, the motor 2 controls 102 the motor assistance based on the second control value S2.

The transition phase thus creates a transition between the first regulation algorithm and the second regulation algorithm 120. However, it turns out that initiating the transition phase based solely on the speed v and of the bicycle 1 can also lead to the transition phase starting even if there is a high speed above the first assistance speed $v_1$, which is based, for example, on existing ambient conditions, such as a short downhill ride of the bicycle 1. In such cases, it is not always desirable for the transition phase for the transition to the control of motor assistance to be carried out by the second regulation algorithm. It is therefore advantageous if a further condition must be met for the transition phase to start. This transition condition can be, for example, that the bicycle 1 is moved over a predefined time interval at a speed above the first limit speed $v_1$ so that the transition phase is started. Alternatively or additionally, a cadence must be above a predefined first threshold value for the transition phase to be initiated. Alternatively or additionally, a driver's torque must be above a predefined second threshold value and/or a driver's power above a predefined third threshold value for the transition phase to be initiated. All these conditions suggest that a driver of the bicycle 1 applies a corresponding amount of energy with the aim of accelerating the bicycle to the downward regulation speed $v_{max}$ and maintaining it at this speed.

The second regulation algorithm 120 provides the motor assistance independently of the driver's torque and power. This could result in the speed v of the bicycle 1 not dropping even when the driver of the bicycle 1 stops pedaling, as this is maintained by the motor assistance by the motor 2, which regulates the speed to the downward regulation speed $v_{max}$. The control of the motor assistance based on the second regulation algorithm 120 can be terminated, for example, by applying the brake of the bicycle 1 by braking the speed v of the bicycle 1 below the first limit speed $v_1$. In order to achieve a more economical behavior, it is advantageous if a termination condition is defined that leads to a transition from the control 102 of the motor assistance based on the second control value S2 to the control 101 of the motor assistance by the motor 2 based on the first control value S1. For example, it is advantageous if a minimum level of cadence, driver's torque and/or driver's power is defined and control of the motor assistance based on the second regulation algorithm is terminated when this minimum level is not reached. In this case, the transition phase is executed for a transition to controlling the motor assistance based on the first control value S1.

The first regulation algorithm 110 is preferably designed in such a way that it provides a comparatively more agile behavior of the motor assistance than is the case with the second regulation algorithm 120. For this purpose, it is advantageous if, for example, a comparatively strong low-pass filtering of input values or output values of the second regulation algorithm 120 takes place in the second regulation algorithm 120. The output value of the second regulation algorithm 120 is the second control value S2. Such low-pass filtering removes peaks in the curve of the second control value S2, thus achieving particularly continuous driving. This supports the feeling of gliding. Conversely, a more dynamic method may be desired, especially during acceleration after the bicycle 1 has started, i.e., when the first regulation algorithm 110 is active. It is therefore advantageous if the first control value S1 is subjected to comparatively weaker low-pass filtering or no low-pass filtering. This also applies to the input parameters of the first regulation algorithm, i.e., for a time curve of the provided driver's torque or the provided driver's power.

Figure 3:
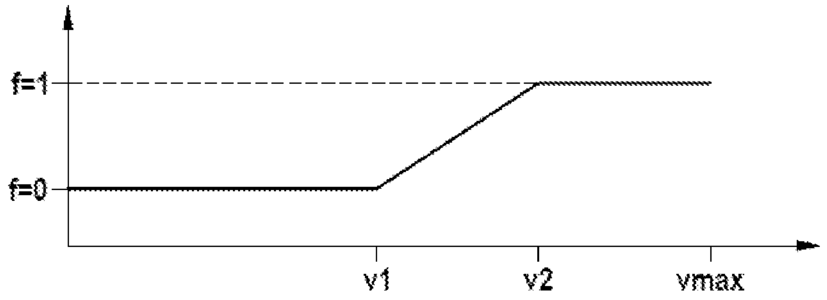

FIG. 3 shows a schematic representation of the parameter f, wherein a transition between the use of the first regulation algorithm and the application of the first control value S1 and the subsequent application of the second regulation algorithm 120 and the second control value S2 is shown. It can be seen, for example, that the parameter f increases linearly in the transition phase. However, other curve shapes are also advantageous for determining the parameter f. For example, the parameter f can increase more quickly with increasing speed.

Figure 4:
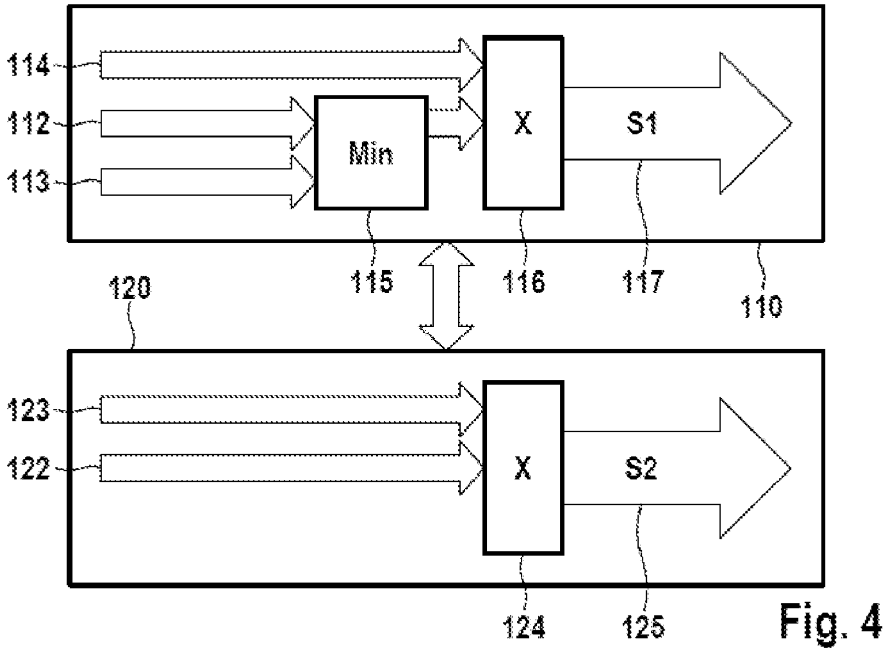

FIG. 4 shows an advantageous combination of an exemplary first regulation algorithm 110 and an exemplary second regulation algorithm 120 according to an embodiment of the disclosure. For example, the first regulation algorithm 110 records a motor torque 112 requested by a driver and compares it with a maximum permissible motor torque 113 via a comparison 115. The smaller motor torque is multiplied by a downward regulation factor 114 in a multiplication step 116 in order to determine the first control value S1 in an output step 117. The downward regulation factor is a parameter that limits the motor assistance above the downward regulation speed $v_{max}$. The downward regulation factor therefore drops to 0 above the downward regulation speed $v_{max}$, which prevents the provision of motor assistance above the downward regulation speed $v_{max}$.

In the second regulation algorithm 120, the motor torque 112 requested by the driver is not considered and the maximum permissible motor torque 122 is multiplied by the downward regulation factor 123 in a multiplication step 124. As a result, the second control value S2 is output in an output step 125 as the result of this multiplication. Because the maximum permissible motor torque is requested at all times, the bicycle 1 accelerates if the maximum permissible motor torque is sufficient. However, the speed is limited by the downward regulation factor 123, which is designed in accordance with the first regulation algorithm 110. The second regulation algorithm 120 is thus independent of the motor torque 112 requested by the driver.

Figure 5:
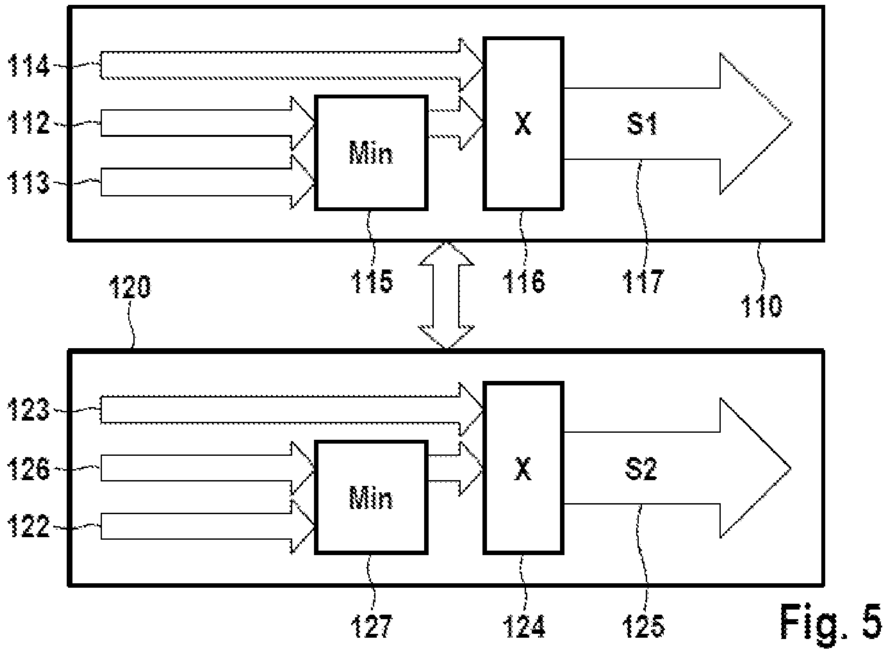

FIG. 5 shows an alternative design of the first and second regulation algorithms 110, 120. The first regulation algorithm 110 corresponds to the first regulation algorithm 110 shown in FIG. 4.

The second regulation algorithm 120 is modified compared to the second regulation algorithm 120 shown in FIG. 4 in such a way that the maximum permissible motor torque 122 is compared in a comparison step 127 with a motor torque 126 requested and filtered by a driver, and the lower value in each case is multiplied by the downward regulation factor 123 in the multiplication step 124 in order to determine the second control value S2. The motor torque 126 requested by the driver is filtered via a low-pass filter. In this second regulation algorithm 120, the motor assistance is also controlled in such a way that the downward regulation speed $v_{max}$ is assumed. However, the maximum permissible motor torque 122 is not necessarily applied if the motor torque 126 requested by the driver is also sufficient for acceleration to the downward regulation speed $v_{max}$.

The alternative downward regulation method provided by the second regulation algorithm is intended to regulate the maximum permissible assistance speed or a target speed just below this in the best possible way by means of motor assistance, regardless of what the driver does (as long as the driver does not terminate the alternative method).

With current methods, the motor assistance during downward regulation is typically still dependent on how hard the driver pedals. As a result, there is a driver influence on the drive torque, which on the one hand leads to an undesirable fluctuation in speed and on the other hand demands a certain amount of personal effort from the driver. In the simplest case, the motor torque is continuously increased when the electric bicycle 1 is traveling slower than the target speed and continuously reduced when the electric bicycle 1 is traveling faster than the target speed. In the preferred case, an attempt is also made to minimize the acceleration at the target speed in order to dampen possible (over)oscillation around the target speed as much as possible.

The alternative downward regulation method dampens the driver's influence in order to enable smoother driving during downward regulation. Normally, the motor torque requirement is also dependent on the filtered driver's torque during downward regulation. The filter is designed to be relatively reactive in sporty modes, so that although the driver's sine wave is dampened, the motor torque still reacts to changing driver's torque. However, the reactivity can be unpleasant in downward regulation because the driver wants to cruise smoothly and relaxed. The alternative downward regulation method can now allow for smoother driving during downward regulation by low-pass filtering the driver's torque on which the motor torque is based to a greater extent than in regular operation. Similarly, the calculated motor torque requirement, which is included in the downward regulation function, can also be (more strongly) filtered.

One of the advantages is that by regulating the $v_{max}$, it is easier and more relaxed for the driver to actually reach the $v_{max}$ as accurately as possible. The electric bicycle 1 is felt to "engage" at the downward regulation speed and pulls the driver at maximum speed unless the driver actively gives the command to stop by reducing the driver's torque or power. The result is a slipstream effect: the driver feels that he is being pulled along.

For a smoother transition between the two different control/regulation methods, it is conceivable to allow the existing control and speed regulation to act proportionally or to continuously merge the methods in the transition area.

Preferably, the second regulation algorithm is only available on certain routes, which can be achieved by geofencing, for example. For example, the transition phase will only be introduced on bicycle highways.

In addition to the written disclosure hereinabove, we make explicit reference to the disclosure of FIGS. 1 through 5.

What is claimed is:

1. A method of controlling a motor assistance provided by a motor of an electric bicycle, comprising:

controlling a motor assistance by the motor based on a first control value when the bicycle is moved at a speed below a first limit speed, wherein the first control value is calculated by way of a first regulation algorithm, and controlling the motor assistance by the motor based on a second control value, after completion of a transition phase, wherein the second control value is calculated by way of a second regulation algorithm, wherein the motor assistance is controlled by the second regulation algorithm such that the speed of the bicycle assumes a downward regulation speed.

2. The method according to claim 1, further comprising:

controlling the motor assistance by the motor based on a transition control value in the transition phase when the bicycle is moved at a speed above the first limit speed, wherein the transition control value is calculated based on the first control value and the second control value.

3. The method according to claim 2, wherein the transition phase lasts for a predefined period of time or ends when the bicycle is moved at a speed above a second limit speed.

4. The method according to claim 3, wherein the controlling of the motor assistance by the motor based on the transition control value and/or the second control value takes place only when:

the bicycle is moved over a predefined time interval at a speed above the second limit speed, a cadence is above a predefined first threshold value, a driver's torque is above a predefined second threshold value, and/or a driver's power is above a predefined third threshold value.

5. The method according to claim 2, wherein:

the first control value is a target value for a motor torque to be provided by the motor or a motor power to be provided by the motor, and/or the second control value is a target value for a motor torque to be provided by the motor or a motor power to be provided by the motor, and/or the transition control value is a target value for a motor torque to be provided by the motor or a motor power to be provided by the motor.

6. The method according to claim 2, wherein the transition control value is determined such that the motor assistance has a continuous course when switching between controlling the motor assistance based on the first control value and controlling the motor assistance based on the second control value.

7. The method according to claim 2, wherein the transition control value is calculated by way of the following formula:

$$M_3=M_1+f^*(M_2-M_1),$$ wherein:

$M_1$ represents the first control value, $M_2$ represents the second control value, $M_3$ represents the transition control value, and f is a parameter that increases or decreases with the transition phase in a speed-dependent or time-dependent manner from 0 to 1.

8. The method according to claim 2, wherein:
the transition control value corresponds to a respectively larger control value of the second control value and of the first control value weighted with a parameter f, and
the parameter f is a parameter which increases or decreases from 0 to 1 as a function of speed or time with the transition phase.

9. The method according to claim 1, wherein the first control value is determined by the first regulation algorithm based on a detected driver's power and/or a detected driver's torque.

10. The method according to claim 1, wherein the second regulation algorithm terminates the control of the motor assistance such that the speed of the bicycle assumes the downward regulation speed when a driver falls below a minimum level of a cadence, a driver's torque and/or a driver's power.

11. The method according to claim 1, wherein the second regulation algorithm controls the motor assistance in such a way that the speed of the bicycle assumes the downward regulation speed, independently of a present driver's torque or a present driver's power.

12. The method according to claim 1, wherein:
the first regulation algorithm performs a less strong low-pass filtering of an input value of the first regulation algorithm influenced by a user than with the second regulation algorithm, and/or
the first regulation algorithm performs a less strong low-pass filtering of the first control value than a low-pass filtering of the second control value by the second regulation algorithm.

13. A bicycle, comprising:
a wheel;
a motor operatively connected to the wheel; and
a device for controlling a motor assistance provided by the motor of, the device operatively connected to the motor and configured to:
control the motor assistance by the motor based on a first control value when the bicycle is moved at a speed below a first limit speed, wherein the first control value is calculated by way of a first regulation algorithm; and
control the motor assistance by the motor, after completion of a transition phase, based on a second control value, wherein the second control value is calculated using a second regulation algorithm, wherein the motor assistance is controlled by the second regulation algorithm such that the speed of the bicycle assumes a downward regulation speed.

14. A device including an electronic computing unit and software, the electronic computing unit configured to execute the software when operably connected to the motor of the electric bicycle and configured to:
control a motor assistance by the motor based on a first control value when the bicycle is moved at a speed below a first limit speed, wherein the first control value is calculated by way of a first regulation algorithm, and
control the motor assistance by the motor based on a second control value, after completion of a transition phase, wherein the second control value is calculated by way of a second regulation algorithm, wherein the motor assistance is controlled by the second regulation algorithm such that the speed of the bicycle assumes a downward regulation speed.

* * * * *